United States Patent [19]
Tremblay et al.

[11] 3,961,539
[45] June 8, 1976

[54] CLUTCH

[75] Inventors: Alain Tremblay, Sainte-Barbe; Jean-Guy Talbot, Valcourt, both of Canada

[73] Assignee: Bombardier Limited, Valcourt, Canada

[22] Filed: Apr. 11, 1975

[21] Appl. No.: 567,110

[30] Foreign Application Priority Data
May 23, 1974 Canada .................................. 200653

[52] U.S. Cl. .......................................... 74/230.17 E
[51] Int. Cl.² .......................................... F16H 55/52
[58] Field of Search ............ 74/230.17 E; 192/105 C

[56] References Cited
UNITED STATES PATENTS
3,759,111  9/1973  Hoff ............................. 74/230.17 E
3,861,229  1/1975  Domaas ......................... 74/230.17 E

*Primary Examiner*—Samuel Scott
*Assistant Examiner*—A. Russell Burke

[57] ABSTRACT

In a rotary clutch for a snowmobile comprising a movable pulley flange which carries pivotally mounted flyweights operable on rotation of the clutch to effect axial displacement of the movable flange towards a fixed pulley flange, the pivot shafts for the flyweights have previously been retained in mounting lugs on the movable flange by cotter pins or the like. Improper maintenance of such clutches has on occasion led to unorthodox methods of retaining the pivot shafts, such as the use of wire instead of cotter pins, or the replacement of the pivot shaft by a nut and bolt thereby causing severe unbalance in the clutch. To obviate this problem, the pivot shafts are now designed to be retained solely by abutment means formed integrally with the bell housing which attaches to the rear side of the movable flange.

3 Claims, 2 Drawing Figures

CLUTCH

FIELD OF THE INVENTION

This invention relates to a variable speed power drive transmission, and more particularly to a centrifugal clutch suitable for use, for example, in the belt drive transmission of a snowmobile.

DESCRIPTION OF THE PRIOR ART

One known form of snowmobile clutch comprises a fixed conical pulley flange adapted to rotate with the output shaft of an engine, and a movable conical pulley flange adapted to slide axially toward and away from the fixed flange to vary the drive ratio of an endless belt driven between the flanges. The movable flange is resiliently urged axially away from the fixed flange, and centrifugally actuacted means are associated with the movable flange and operable at a predetermined speed of rotation to overcome the resilient force and displace the movable flange axially towards the fixed flange with a force which increases with the speed or rotation. The centrifugally actuacted means comprises a plurality of flyweights spaced at uniform angular intervals about the axis of the shaft and pivotally mounted on the movable flange, each flyweight being adapted to cooperate with a follower means and a corresponding radial limb of a spider which is fixed in relation to the shaft. Each flyweight is mounted on a pivot shaft received in aligned through bores in a pair of spaced lugs positioned close to the periphery of the movable flange, the pivot shaft being retained in position by suitable cotter pin means or the like.

Each arm of the spider has bifurcate portions between which extends a pin, the follower comprising a roller rotatably mounted on the pin between the bifurcate portions. The ends of the pin extend beyond the bifurcate portions of the spider limb, and each is enclosed in a cap of low friction material, such as nylon, the caps being slidable against opposed axially extending guide surfaces carried by the movable flange, thus guiding the movable flange in its axial movements, and preventing rotation of the movable flange relative to the shaft. The above described clutch is designed primarily as a high speed, racing clutch for use in snowmobiles, the flanges being fabricated as alluminum castings. Due to the high speed of operation of the clutch, it is most important the parts of the clutch be properly balanced. However, it has been found that in practice, improper maintenance of the clutch has in some instances resulted in the pivot shafts being retained, not by the specified cotter pins, but by assorted pieces of wire, or even replaced completely by a bolt and nut combination extending through the lugs and flyweights. Such irregularities can produce major unbalanced forces in the clutch at high speed operation, leading, in some circumstances, to accidental destruction of the clutch.

SUMMARY OF THE INVENTION

According to the invention, in a clutch as described above, the flyweight pivot shafts are retained, not by cotter pins or the like, but by a pair of spaced projecting bodies provided on a bell housing detachably secured to the rear of the movable flange, so that when the bell housing is attached to the flange, the projecting bodies straddle the lugs and form a pair of closely spaced abutments adjacent respective ends of each pivot shaft thus preventing disassembly of the pivot shaft until the bell housing is detached from the movable flange. This arrangement reduces the possibility of an operator upsetting the balance of the clutch by using improper components in the flyweight pivot mounting.

A further improvement in the above described clutch involves a modification of the caps which enclose the ends of the pins on the limbs of the spider. With the arrangement described, it has been found that there is some tendency for the sliding cooperation with the guide surfaces on the movable flange to produce distortion, or even detachment of the caps on the ends of the pins. To reduce this problem, the caps are designed with base portions each of which is recessed tightly within a counterbore around the pin in the corresponding bifurcate portion of the spider limb.

The invention will further be described, by way of example only, with reference to the accompanying drawings in which:

DESCRIPTION OF THE PREFERRED EMBODIMENT

Figure 1:
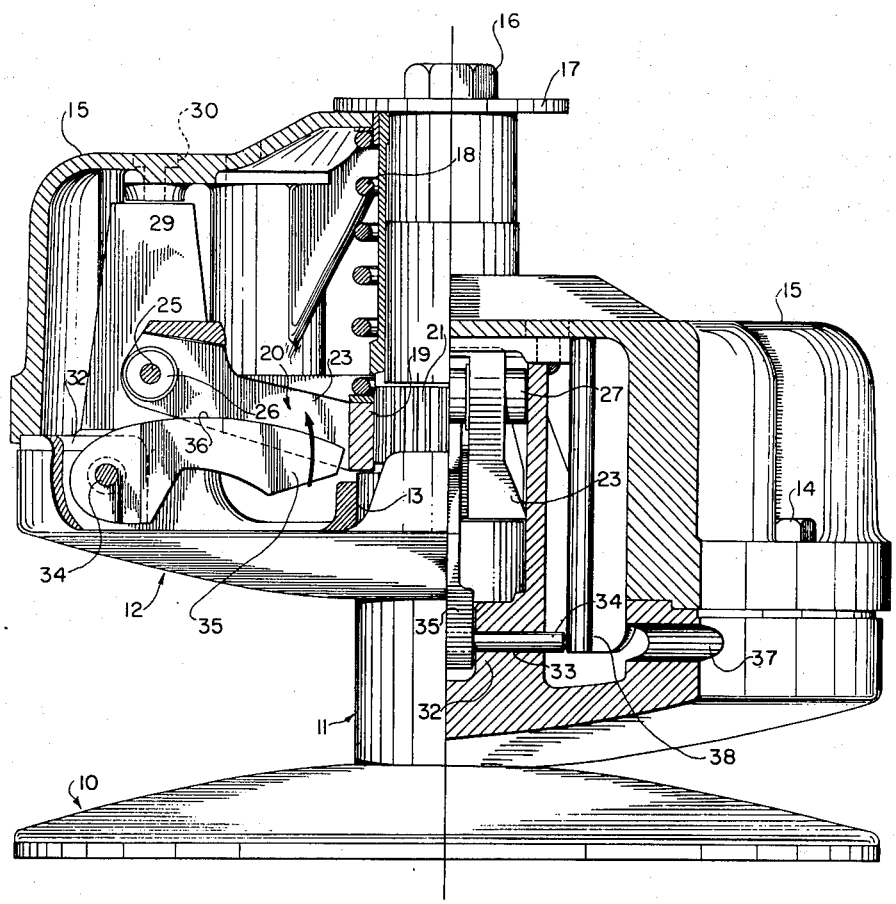
FIG. 1 is an elevation of the clutch, the right hand side being sectioned on the line A—A of FIG. 2, and shown in one position of operation, and the left hand side being sectioned on the line B—B in FIG. 2, and showing another position of operation.

Referring to the drawings, the clutch comprises a first, generally conical, pulley flange 10 fixed to rotate with the shaft 11 and a confronting, generally conical movable flange 12 having a bore 13 which slidably receives the shaft 11. Each of the flanges 10 and 12 is of light weight construction, being fabricated in aluminum alloy, the movable flange 12 having attached to the rear side thereof by suitable cap screw means 14, a bell housing 15 which forms an annular chamber around the shaft 11. The shaft 11 is hollow and is adapted to receive a driving shaft (not shown), such as the output shaft of an engine, the clutch being secured to the latter by means of a axial bolt 16 which clamps a large washer 17 against the end of the shaft 11.

The movable flange 12 and bell housing 15 are displacable as a unit axially with respect to the shaft 11 from one limiting position as shown in the left hand side of FIG. 1 to a second limiting position as shown in the right hand side of FIG. 1, the assembly being urged towards the former limiting position, which is defined by abutment between the bell housing 15 and the washer 17, by means of a coiled compression spring 18 concentrically surrounding a portion of the shaft 11. During this movement, the bore 13 provides a bearing upon the shaft 11.

One end of the spring 18 presses against the bell housing 15, and the other end presses against the hub 19 of a spider member 20 which is keyed upon, and axially fixed with respect to, a splined portion 21 of the shaft 11.

Figure 2:
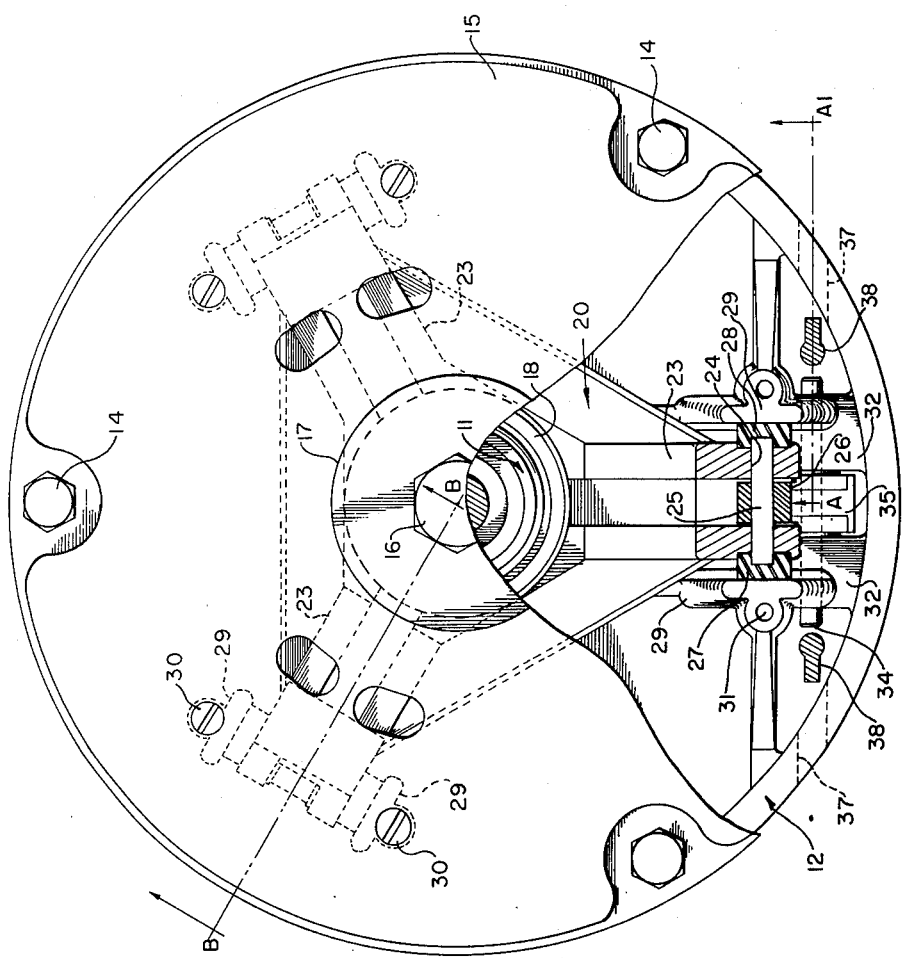
FIG. 2 is a partly sectioned plan view of the clutch.

As is best seen in FIG. 2, the spider 20, which is a light weight alluminum alloy casting, comprises three limbs radially extending at equal -angular intervals, each of the limbs having parallel extending bifurcate arms 23. The extremities of each pair of arms 23 have aligned bores 24 through which extends a closely fitting pin 25 which forms a bearing for a roller follower 26 positioned between the bifurcate arms. Each extremity of the pin 25 is enclosed by a closely fitting cap 27 of nylon, each cap having a base portion received in tightly fitting engagement in a counterbore in the corresponding arm 23, as best seen in FIG. 2.

The end surfaces of the caps 27 are in closely fitting sliding engagement with the respective ones of a pair of opposed, axially extending guide surfaces, formed on tapering, buttress walls 29 cast intregally with the movable flange 12. The upper ends of the walls 29 approach the radial wall of the bell housing 15, and are secured thereto by cap screws 30 received in threaded bores 31 (see FIG. 2) in the walls 29.

Radially outwardly of the base of each wall 29 is an upstanding lug 32 integral with the flange 12, the lugs being arranged in pairs having aligned bores 33 therethrough which receive a closely fitting pivot shaft 34. As is best shown in FIG. 1, each pivot shaft forms a pivotal support for a flyweight 35 which, in its nonoperative position as shown in the left hand side of FIG. 1, extends generally radially inwardly of the pivot pin and has a curved cam surface 36. Providing access to each pivot shaft 34 for the removal and replcement thereof, the peripheral rim portion of the flange 12 is formed with pairs of aligned registering bores 37 through which the pivot shaft 34 may be inserted or removed.

Each pivot shaft 34 is normally retained against axially displacement by abutment means in the form of a pair of webs 38 cast integrally with the bell housing 15 and straddling the ends of the pivot shaft 34 in closely spaced relationship thereto. These webs 38 form the only means retaining the pivot shafts 34 in the assembled position.

In operation, the movable flange/bell housing assembly, when stationary or rotating at low speeds, occupies the position shown in the left hand side of FIG. 1. As the speed of rotation of the clutch is increased, the centrifugal force acting upon the flyweights 35 cause these to rotate upwardly in the direction of the arrow in FIG. 1 so that each cam surface 36 is pressed into engagement with the corresponding roller 26 on the spider 20. The force of this engagement, being centrifugally generated, increases with speed of rotation, until it is of sufficient strength to overcome the force of the compression spring 18 and commence dispacement of the movable flange/bell housing assembly axially towards the fixed flange 10. The geometry of the flyweights 35 in relation to the roller 26 is chosen to be such that once this movement begins, it proceeds very rapidly with increased speed of rotation, until the movable flange is axially shifted to the position shown in the right hand side of FIG. 1. During this movement, the flange 12 is guided in the axial direction by sliding engagement between the caps 27 of the spider, and the guidewalls 29 of the flange 12. The interaction of these parts also constraining the movable flange 12 to rotate with the fixed flange 10. It will be appreciated that by virtue of the tightly fitting engagement of the bottom portion of each cap 27 in the counterbore in the arm 23 of the spider, the tendency of the cap 27 to become distorted or displaced by its sliding engagement with the guidewall 29 is substantially reduced.

What we claim as our invention is:

1. In a rotary clutch comprising a fixed pulley flange adapted to rotate with a clutch shaft, and a movable pulley flange adapted to slide axially towards and away from said fixed flange to vary the drive ratio of an endless belt driven between said flanges, said movable flange being resiliently urged axially away from said fixed flange; centrifugally actuated means operable at a predetermined speed of rotation to overcome said resilient means and displace the movable flange axially towards the fixed flange with a force which increases with the speed of rotation, said centrifugally actuated means comprsing a plurality of flyweights spaced at uniform angular intervals about the axis of the shaft and pivotally mounted on a part associated with the movable flange, each said flyweight being adapted to co-operate with a follower means on a corresponding radial limb of a spider which is fixed in relation to said shaft; means constraining said movable flange to rotate with said fixed flange; said flyweight and spider being enclosed within a housing detachably secured to the rear side of said movable flange;

The improvement comprising:
each flyweight being mounted on a pivot shaft received in aligned through bores in a pair of spaced lugs close to the periphery of said movable flange, and said housing including for each flyweight a pair of projecting bodies which straddle said lugs and form a pair of closely spaced abutments adjacent respective ends of said pivot shaft, thus preventing disassembly thereof when the housing is attached to the movable flange, said pivot shaft being readily removable upon detachment of the housing.

2. The improvement according to claim 1 wherein the peripheral portion of said movable flange includes a pair of bores aligned with opposite ends of each said pivot shaft to facilitate removal thereof after detachment of the bell housing.

3. The improvement according to claim 1 wherein each said limb on the spider is bifurcate, and said follower means comprises a roller rotatably mounted on a pin extending between bifurcate portions of a corresponding limb, the pin having end portions beyond the bifurcate portions and each being enclosed by a cap of low friction material, said caps being slidable against respective opposed axially extending guide surfaces carried by the movable flange, each said cap having a base portion recessed and tightly received within a counterbore around the pin in the corresponding bifurcate portion of the spider limb, said movable flange being constrained to rotate with said fixed flange through the engagement of said caps with the corresponding guide surfaces.

* * * * *